(12) United States Patent
Carter

(10) Patent No.: US 8,521,655 B2
(45) Date of Patent: Aug. 27, 2013

(54) ENGINE, SYSTEM AND METHOD FOR PROVIDING CLOUD-BASED BUSINESS INTELLIGENCE

(75) Inventor: Michael M. Carter, Wayne, PA (US)

(73) Assignee: BizEquity LLC, Wayne, PA (US)

(*) Notice: Subject to any disclaimer, the term of this patent is extended or adjusted under 35 U.S.C. 154(b) by 0 days.

(21) Appl. No.: 13/311,916

(22) Filed: Dec. 6, 2011

(65) Prior Publication Data

US 2012/0310820 A1     Dec. 6, 2012

Related U.S. Application Data

(60) Provisional application No. 61/538,994, filed on Sep. 26, 2011, provisional application No. 61/493,647, filed on Jun. 6, 2011.

(51) Int. Cl.
| | |
|---|---|
| *G06Q 99/00* | (2006.01) |
| *G06Q 40/00* | (2012.01) |
| *G06Q 10/00* | (2012.01) |
| *G07B 17/00* | (2006.01) |
| *G06F 15/16* | (2006.01) |
| *G06F 15/173* | (2006.01) |

(52) U.S. Cl.
USPC ........... 705/317; 709/203; 709/217; 709/223; 709/224; 709/226

(58) Field of Classification Search
None
See application file for complete search history.

(56) References Cited

U.S. PATENT DOCUMENTS

| 6,549,944 | B1 * | 4/2003 | Weinberg et al. ............. 709/224 |
| 6,901,553 | B1 * | 5/2005 | Hayashi et al. ............... 715/234 |
| 6,985,147 | B2 * | 1/2006 | Asakawa et al. .............. 345/467 |
| 7,107,338 | B1 * | 9/2006 | Nareddy et al. ............... 709/224 |
| 7,464,122 | B1 * | 12/2008 | Basko et al. .......................... 1/1 |
| 7,672,879 | B1 * | 3/2010 | Kumar et al. .................... 705/30 |
| 8,353,012 | B2 * | 1/2013 | Del Real ........................... 726/4 |
| 2002/0007330 | A1 * | 1/2002 | Kumar et al. .................... 705/36 |
| 2002/0023108 | A1 * | 2/2002 | Daswani et al. ............... 707/507 |
| 2002/0091639 | A1 * | 7/2002 | Mandahl et al. ................ 705/50 |
| 2002/0143819 | A1 * | 10/2002 | Han et al. ....................... 707/513 |
| 2003/0120649 | A1 * | 6/2003 | Uchino et al. ...................... 707/5 |
| 2004/0015560 | A1 * | 1/2004 | Yamaguchi et al. .......... 709/217 |
| 2004/0111530 | A1 * | 6/2004 | Sidman .......................... 709/245 |
| 2004/0148503 | A1 * | 7/2004 | Sidman .......................... 713/167 |
| 2005/0131953 | A1 * | 6/2005 | Sugiyama et al. .......... 707/104.1 |
| 2006/0074727 | A1 * | 4/2006 | Briere ............................... 705/8 |
| 2007/0061266 | A1 * | 3/2007 | Moore et al. ..................... 705/51 |
| 2007/0203720 | A1 * | 8/2007 | Singh et al. ....................... 705/1 |
| 2008/0080526 | A1 * | 4/2008 | Gounares et al. ............. 370/401 |
| 2008/0109283 | A1 * | 5/2008 | Binnie et al. ...................... 705/7 |

(Continued)

*Primary Examiner* — Gregory Johnson

(74) *Attorney, Agent, or Firm* — Barnes & Thornburg LLP; Thomas J. McWilliams; Edward F. Behm, Jr.

(57) ABSTRACT

An engine, system and method for providing cloud-based business intelligence data, responsively to received company information, including a local front end comprising a graphical user interface capable of locally querying a user for an electronic location of the received company information, and ones of the business intelligence data to be displayed on the graphical user interface upon upload of the received company information from the electronic location, and further including an at least partially remote back end, comprising an accessing engine capable of accessing the electronic location for uploading to the cloud of only ones of the received company information indicative of the ones of the business data intelligence to be displayed, and a charging engine for charging an account of a user of the front end $1 per the ones of the business intelligence data to be displayed.

28 Claims, 4 Drawing Sheets

(56) References Cited

U.S. PATENT DOCUMENTS

| | | | |
|---|---|---|---|
| 2008/0133404 A1* | 6/2008 | Bascom | 705/39 |
| 2008/0183744 A1* | 7/2008 | Adendorff et al. | 707/102 |
| 2009/0216569 A1* | 8/2009 | Bonev et al. | 705/5 |
| 2009/0216747 A1* | 8/2009 | Li et al. | 707/5 |
| 2009/0276771 A1* | 11/2009 | Nickolov et al. | 717/177 |
| 2009/0319166 A1* | 12/2009 | Khosravy et al. | 701/200 |
| 2009/0319348 A1* | 12/2009 | Khosravy et al. | 705/14.1 |
| 2010/0054176 A1* | 3/2010 | Fein et al. | 370/316 |
| 2010/0082682 A1* | 4/2010 | Kinoshita | 707/784 |
| 2010/0185968 A1* | 7/2010 | Hsu et al. | 715/771 |
| 2010/0205065 A1* | 8/2010 | Kumar et al. | 705/26 |
| 2010/0211895 A1* | 8/2010 | Mistry et al. | 715/764 |
| 2010/0223157 A1* | 9/2010 | Kalsi | 705/27 |
| 2010/0275263 A1* | 10/2010 | Bennett et al. | 726/25 |
| 2010/0281364 A1* | 11/2010 | Sidman | 715/713 |
| 2010/0293221 A1* | 11/2010 | Sidman et al. | 709/203 |
| 2010/0332593 A1* | 12/2010 | Barash et al. | 709/203 |
| 2011/0107088 A1* | 5/2011 | Eng et al. | 713/155 |
| 2011/0184863 A1* | 7/2011 | Coleman et al. | 705/40 |
| 2011/0202469 A1* | 8/2011 | Venkateswaran et al. | 705/301 |
| 2011/0209049 A1* | 8/2011 | Ghosh et al. | 715/236 |
| 2011/0213655 A1* | 9/2011 | Henkin et al. | 705/14.49 |
| 2011/0225107 A1* | 9/2011 | Khosravy | 706/12 |
| 2011/0246297 A1* | 10/2011 | Buchalter et al. | 705/14.53 |
| 2011/0265147 A1* | 10/2011 | Liu | 726/4 |
| 2012/0011077 A1* | 1/2012 | Bhagat | 705/317 |
| 2012/0060216 A1* | 3/2012 | Chaudhri et al. | 726/21 |
| 2012/0069131 A1* | 3/2012 | Abelow | 348/14.01 |
| 2012/0101975 A1* | 4/2012 | Khosravy | 706/55 |
| 2012/0109699 A1* | 5/2012 | Hatfield | 705/7.12 |
| 2012/0110515 A1* | 5/2012 | Abramoff et al. | 715/854 |
| 2012/0173628 A1* | 7/2012 | Briere et al. | 709/204 |
| 2012/0190386 A1* | 7/2012 | Anderson | 455/456.3 |
| 2012/0284312 A1* | 11/2012 | Gore et al. | 707/810 |
| 2012/0310875 A1* | 12/2012 | Prahlad et al. | 707/602 |

\* cited by examiner

ENGINE, SYSTEM AND METHOD FOR PROVIDING CLOUD-BASED BUSINESS INTELLIGENCE

CROSS-REFERENCE TO RELATED APPLICATION

This application claims priority to U.S. Provisional Patent Application Ser. No. 61/538,994, filed Sep. 26, 2011, entitled Engine, System and Method for Providing Cloud-Based Business Intelligence, and to U.S. Provisional Patent Application Ser. No. 61/493,647, filed Jun. 6, 2011, entitled Engine, System and Method of Providing Cloud-Based Business Valuation and Associated Services, the entireties of which are expressly incorporated herein by reference.

BACKGROUND

1. Field of the Invention

The present invention relates to aspects associated with a business, and, more particularly, to an engine, system and method for providing cloud-based business intelligence.

2. Background of the Invention

Business intelligence ("BI"), as used herein, includes computer-based techniques used in identifying, obtaining, extracting, and/or analyzing business data, for a business or for portions of a business. By way of non-limiting example, BI may include sales revenue by product or department, or by generation costs or net income. BI computing may provide historical, current or predictive views of aspects of a subject business. As such, BI computing may include any methodology, process, architecture, or technology that transform raw data into meaningful and useful information for the business, and that may thus be used to enable more effective strategic, tactical, and operational insights and decision-making.

As such, BI computing may support improved business decisions. By comparison, while BI uses technologies, processes, and applications to analyze mostly internal data, competitive intelligence ("CI") gathers, analyzes and disseminates information focused on competitors. Nevertheless, broadly understood BI typically includes, as a subset thereof, CI.

BI may also perform or make use of data integration, data quality, data warehousing, master data management, text and content analytics, and similar information management functions to obtain or prepare data. Therefore, "data preparation" and "data usage" may be deemed separate but linked segments of a BI architecture. For example, data usage may include reporting, analytics and dashboards, while data preparation may include data conversion and/or warehousing for use in such reporting, analytics and dashboards.

As used herein, "analytics" or "business analytics" may focus on developing new strategies and understanding of business performance based on the data indicating the metrics of BI. As used herein, "dashboard," "interface," "graphical user interface" ("GUI") and like terms may indicate an interactive display to a user, such as on a display screen of a computing device, that provides the user with information in an organized and understandable manner.

As such, a first generation of BI computing harnessed information via kluge information extraction and proprietary reporting, which necessitated the vast data stores and data warehouses that held data in large databases. In such initial stage BI computing, executives could not access the large volume of cross-enterprise information in a consumable format that would allow for actionable decisions absent detailed knowledge of silo-reporting mechanisms, if such mechanisms were even available. This results in a vast data store of information that is not consumable by, insightful for, or actionable to the most important decision makers in a given company.

A second generation of BI computing leverages the traditional enterprise technology environment by creating virtual data warehouses stored via Enterprise Information Integration ("EII") technologies that allow for providing of the resulting data in an easier-to-use dashboard technology with reporting. However, such dashboard technologies provide improved access to only the same kluge information that first generation BI computing was built upon. As such, even these second generation BI computing systems bind a company to a large supplier of BI systems, wherein the company's use of the supplied system is invariably bogged down by the weight of the company's own voluminous data generated to the BI system.

Thus, billions of dollars have been spent on traditional BI solutions, but BI in the available art still suffers from three fundamental problems: it is a data choke point; it is a cost center, and it does little to simplify or enhance the user experience. Therefore, the need exists for an engine, system and method of using data for BI that alleviates BI as a data choke point, eliminates BI as a cost center, and simplifies and enhances the user's experience with BI.

SUMMARY

The present invention includes an engine, system and method for providing cloud-based business intelligence data, responsively to received company information. The engine, system and method may include a local front end comprising a graphical user interface capable of locally querying a user for an electronic location of the received company information, and ones of the business intelligence data to be displayed on the graphical user interface upon upload of the received company information from the electronic location. The apparatus, system and method may further include an at least partially remote back end, comprising an accessing engine capable of accessing the electronic location for uploading to the cloud of only ones of the received company information indicative of the ones of the business data intelligence to be displayed, and a charging engine for charging an account of a user of the front end $1 per the ones of the business intelligence data to be displayed.

Thus, the present invention provides an engine, system and method of using data for BI that alleviates BI as a data choke point, eliminates BI as a cost center, and simplifies and enhances the user's experience with BI. It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings, like numerals represent like elements, and.

DETAILED DESCRIPTION

Figure 1:
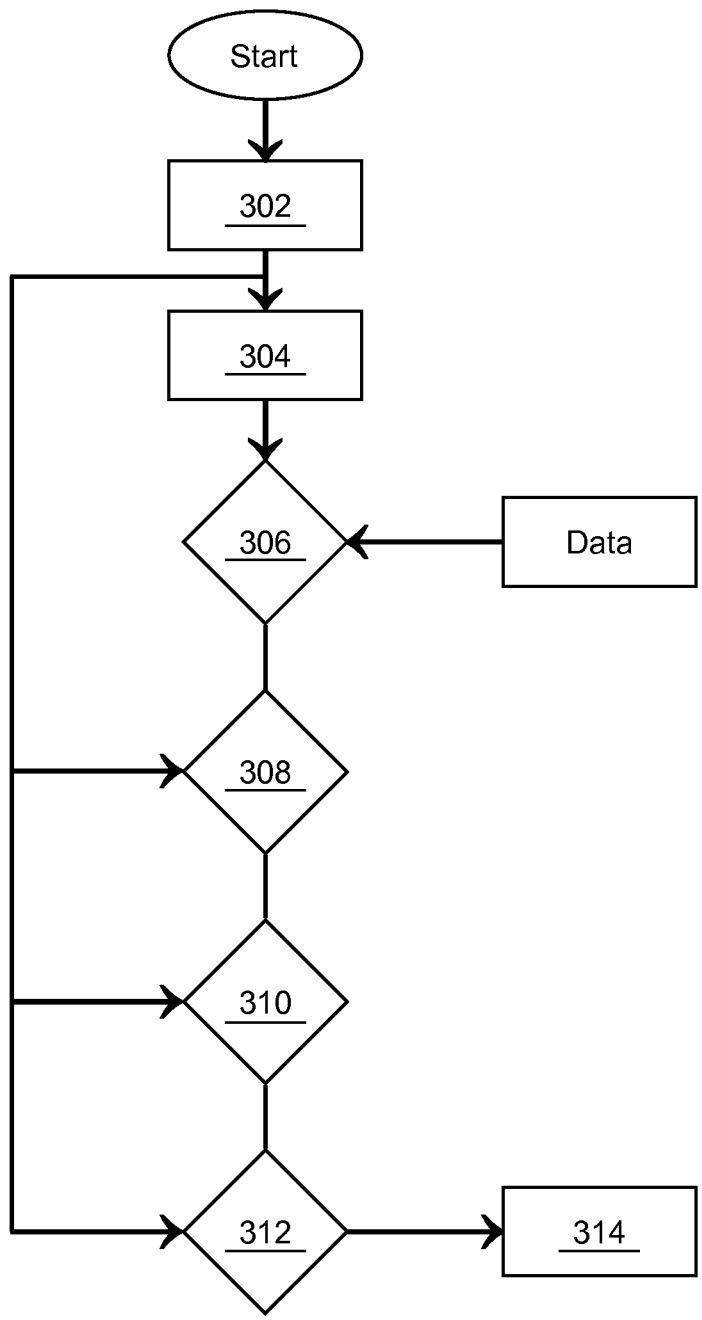
FIG. 1 illustrates an aspect of an exemplary embodiment of the present invention.

Computer-implemented platforms, engines, systems and methods of use are disclosed that provide networked access to a plurality of types of digital content, including but not limited to video, audio, data, metadata, hyperlinks, interactive and document content, and that track, deliver manipulate, transform and report the accessed content. Described embodiments of these platforms, engines, systems and methods are intended to be exemplary and not limiting. As such, it is contemplated that the herein described systems and methods can be adapted to provide many types of cloud-based data aggregation, reporting, and the like, and can be extended to provide enhancements and/or additions to the exemplary platforms, engines, systems and methods described. The invention is thus intended to include all such extensions. Reference will now be made in detail to various exemplary and illustrative embodiments of the present invention.

The present invention changes BI from a cost center to a revenue center. More particularly, the present invention makes use of data that is already available to the enterprise, and helps the executives of the enterprise simplistically make use of only the data they need to make money from the existing investments of the enterprise in data collection.

Moreover, the present invention alleviates the silo-ization of BI, and as such eliminates BI as a data choke point in the enterprise. More particularly, the data for BI in the available art resides in independent silos, such as on the premises, in the cloud, in spreadsheets on a network, and in internal untargeted reports. Such data is all but impossible to search, and the non-real-time nature of the data often makes the data inaccurate or irrelevant even if it can be located. Likewise, the underlying data may be manipulated or modified for a report such that, even if the desired data is located, it may be so manipulated as to have become useless or unrecognizable. The present invention makes the data from such silos available, in real time as it is accumulated, in a reporting manner customized to the desires of the receiving user.

The apparatus, system and method of the present invention provide for the focused accumulation and consumption of Business Intelligence ("BI") data. The accumulation and consumption of such BI data may avail a company of real and usable intelligence for and from CXO's across the enterprise, across devices, and across systems.

The present invention employs mobile and cloud based technology to enable the un-binding of the enterprise. Thereby, any executive/CXO of the enterprise may access only the data needed to make decisions in real-time, and may use existing dashboard technologies to provide that data as that executive sees fit. Further, because only the data needed for that executive may be prepared and used, the enterprise may pay for only the data consumed, which may be as little as, for example, $1/100$ of the cost to the enterprise of a traditional BI system with dashboard reporting. More particularly, the dashboard of the present invention is not a canned dashboard report drawing, from voluminous data, the report data selected by the user of the dashboard. Rather, the instant dashboard provides a real time status, or score, drawn from nimble, real time data drawn only from data of interest to that user.

Figure 2:
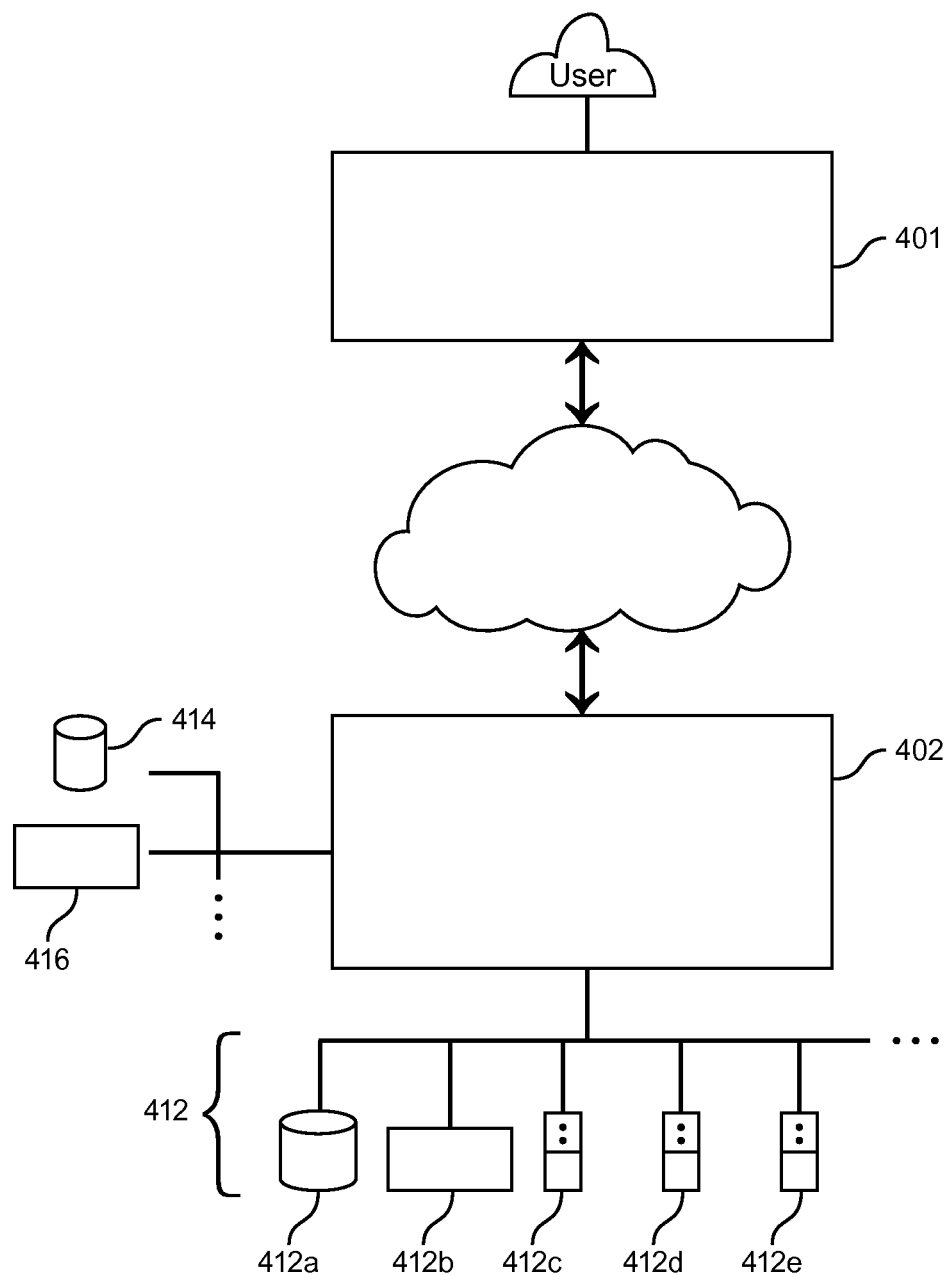
FIG. 2 illustrates an aspect of an exemplary embodiment of the present invention.

More particularly, and as illustrated in the flow diagram of the method 300 of FIG. 1 and the system block diagram of the system 400 of FIG. 2, a user/executive may sign up to a Software as a Service (SaaS), enterprise intelligence offering at step 302. For example, a user may enter enterprise-related information, grant access to enterprise information or locations, develop a secure user profile or password, and the like. Further, the user's position within the enterprise may indicate, such as using security protocols, what data may be accessible to the particular user.

At step 304, the user may select the BI to be tracked by that user. By way of non-limiting example, the user may be provided with a search for information, by topic, in the systems to which access was granted, a tree-diagram of information, such as with html or xml links to the information, and/or with a series of pull-down menus from which may be selected Key Performance Indicators (KPIs) and Key Risk Indicators (KRIs). Yet more particularly, a pull down list may allow for selection of a preferred BI "pack" dedicated to an executive at the user's position entered in step 302, such as, for example, wherein a user receives a recommendation for a CEO pack; a CFO pack; a VP of Sales pack; a VP of Marketing pack; a CIO pack; a General Counsel Pack; or a VP of Technology pack.

By way of non-limiting example, available KRI's and KPI's may include Sales, Sales Growth, Gross Margin, Gross Margin By Product, Cost of Sales, Cost of Lead, Net Income, Ebitda, SG&A, Ebit, Pre Tax Earnings, Forecast Value, Pipeline Value, Customer Concentration, Total Number of Leads, Time to Close Ratio, Employee Count, System Uptime, System failures, Web Traffic, Unique Visitors, Conversion Cost, Business Value, and/or Business Score, Credit Rating, or the like. Needless to say, other KPI's or KRI's may also be made available through the use of the present invention.

At step 306, the user may select the exact location of the data for which the BI will be generated. For example, the user authorization at step 302 may allow for a search for data at networked locations, cookied or historical web locations, locations indicated by desktop or mobile apps, or the like. Additionally and alternatively, the user may be provided with a tree menu, a search menu, a drop-down menu, or the like, from which the location of the data of interest may be received. For example, the user may indicate that the data of interest is stored at html-linked or ftp-linked remote or local locations, or more particularly resides at Salesforce.com, SugarCRM, Workplace servers or file directories, Departmental storage (i.e., the accounting department server, the human resources server, etc.), at or via Google, at or via Facebook, at SAP or a similar remote repository, or the like.

The system may query the user, at step 308, for the user to provide a mapping or domain IP request for the data to be uploaded to perform the requested BI for that individual user. Further, at step 308, the user may indicate the manner in which such data is to be uploaded to provide the BI in the desired fashion on the cloud-based dashboard of the present invention, as detailed further with respect to step 312. Of course, if a user declines to make the data available, the user may be referred to a telephonic help line or an online chat window, such as within a predetermined time such as within 30 minutes of sign-up, to gain the user's, to gain the user's permission for the necessary data upload and data conversion.

At step 310, the user may be queried as to goals for the business. Such goals may include thresholds for expenditures, sales, revenue, growth, number of employees, and the like. Similarly, such goals may include asset-building tasks, such as research and development, intellectual property protections, and the like. Further, such goals may include indications of competitors.

A sample or recommended dashboard, such as in light of the selected CXO pack or the data to be accessed, may display at step 312. Additionally and alternatively, the user may be asked to indicate features of a desired dashboard at step 312.

Further, the user may be queried as to how the user will typically access the user's dashboard, such as from what device or using what operating system. Options may include, by way of non-limiting example, dashboard presentation to the cloud, to a smartphone or similar mobile device (and if so what OS the app will be accessed on), or both. Needless to say, the user may be enabled to access the dashboard and its BI presentation anywhere from any device, irrespective of the option selected at step 312.

Finally, the user may be asked to pay for the service of the present invention at step 314. The user may be asked to approve a recurring charge, such as to a Paypal or credit card or bank account, and/or may be given an option to cancel at any time or after a certain time (such as wherein a one year contract, or the like, is required, and/or may be asked to pay in advance for a certain term of service, such as 1 year. Additionally, in a particularly preferred embodiment, the user may be charged a certain rate per metric of BI selected at step 304, such as per week or per month. By way of non-limiting example, the user may select, at step 314, to be charged $1.00 USD per metric, per month, such as for at least one month or for at least one year, for the metrics of interest selected by the user at step 304.

Thereby, the present invention may allow for monitoring and measuring BI in the form of KPI and/or KRI scores provided responsive to a 7 step, by way of non-limiting example, cloud-based BI system that does Rapid Data Mapping (RDP) for only that data, or, in alternative embodiments, for at least that data, of interest to that user. Additionally, for example, such a BI service may be provided, according to the present invention, using a $1 per metric, per month SaaS BI system, wherein a user enters the data she wishes to track, and that data is mapped to or from other SaaS or cloud based services or data applications the enterprise is running to the dashboard of the instant invention.

FIG. 2 illustrates, with greater particularity, an exemplary frontend 401 and backend 402 to enable system 400 to provide method 300. More particularly, the backend 402 communicates, at the direction of the user, with any existing system 412, such as via an accessing engine comprised of computing code, to obtain solely the data of interest to the user at the cost accepted by the user as indicated by a charging engine comprised of computing code associated with the backend 402. Such data of interest may be resident at third party system 412a, customer relationship management system 412b, enterprise resource planning system 412c, human resources system 412d, and/or financial system 412e, and/or such data may be resident at data repository 414 or reporting system 416.

This data may be delivered in real-time, as BI, to the user at frontend 401. Frontend 401 may comprise a dashboard, such as in a browser-based view or in an app, such as to any of a variety of devices, such as a laptop, iPhone, iPad, Blackberry or Android phone or tablet. Thereby, back end 401 may scale up for large numbers of users of front ends 401.

Thereby, back end 402 may access any data source 412 414, 416, such as, but not limited to, relational databases (such as JDBC), OLAP, Excel, hosted CRMs such as SalesForce.com, Business Objects, XML, SOAP, Java beans (POJO), flat files, OLAP cubes, SAP, PeopleSoft, JD Edwards, Siebel CRM, and/or other real-time and near-real-time systems. Bandwidth savings may result in the event back end 402 access only the data from those data sources 412, 414, 416 indicated as of interest to the user of front end 401. Nevertheless, front end 401 may be provided, by virtue of back end 402, with unlimited drill downs, in part because of the myriad data available to back end 402, even if such data is not initially directed for upload to frontend dashboard 401—that is, the user may have drill down available even for data not included in a selected data pack, such as for a per-use or enterprise-level fee, or for free. Further, back end 402 may expose, upon request from front end 401, the origination point for any data used to generate BI.

More particularly, a dashboard in accordance with front end 401 may include: Flash-based user interactivity; charts and custom geographic map charting; drag and drop functionality; view and sub-window copy and re-use; collaboration between dashboard users, either within department or across departments, such as including view sharing and/or a chat feature; drilldown; analytics and real-time monitoring and customized real time "scoring"; interactive and ad-hoc reports, with drill down, on data of interest to the specific user; data security. Likewise, front end 401 may deliver, at user request, alerts for exceptions (standard or user-indicated) or triggers of business-rules, by way of non-limiting example.

More particularly, front end 401 may allow for development of a user-based or enterprise-based scoring system. Occurrences (such as KPI or KRI) affecting scores, such as at a predetermined level, may cause alerts, score-based emails, or the like, to execute to front ends 401, such as enterprise-wide or only within the department of interest for the KPI or KRI. Correspondingly, collaboration between front ends 401 may be enabled at all times, and/or may be enabled between departments of interest upon a trigger as referenced above.

Figure 3:
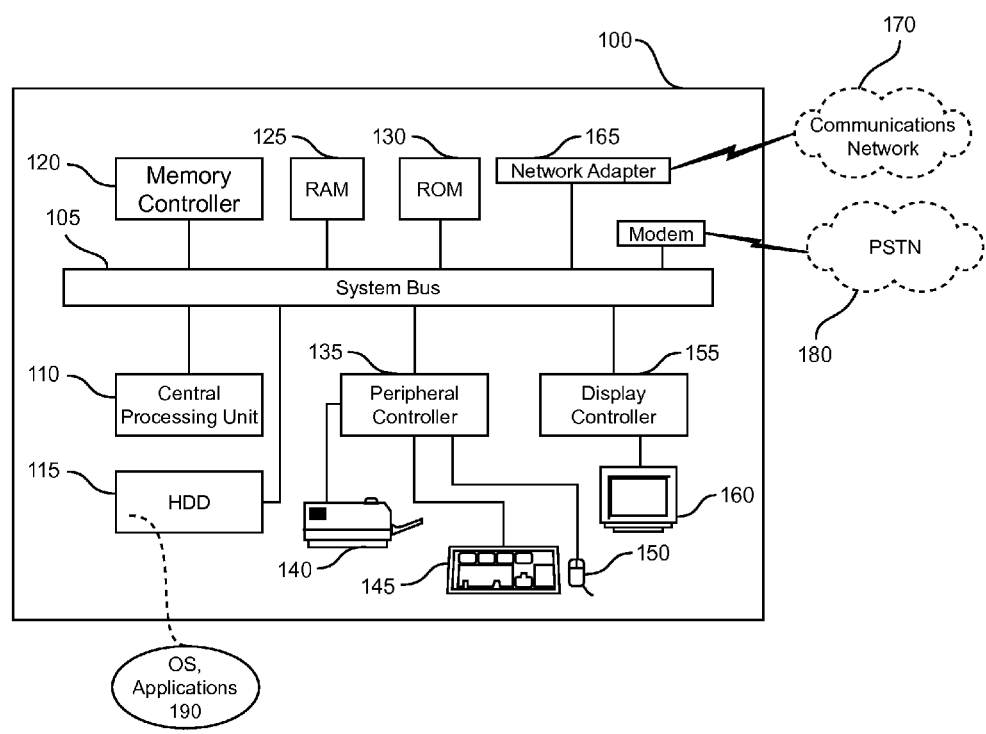
FIG. 3 illustrates an aspect of an exemplary embodiment of the present invention.

FIG. 3 depicts an exemplary computing system 100 for use in accordance with herein described system and method. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs and applications (also referred to as "apps"), and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output and/or presentation generated by or at the request of computing system 100. Such visual output may include text, graphics, animated graphics, and/or video, for example. Display 160 may be implemented with a CRT-based video display, an LCD-based display, gas plasma-based display, touch-panel display, or the like. Display controller 155 includes electronic components required to generate a video signal that is sent to display 160.

Further, computing system 100 may contain network adapter 165 which may be used to couple computing system 100 to an external communication network 170, which may include or provide access to the Internet Protocol ("IP") communications. Communications network 170 may provide user access for computing system 100 with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 4:
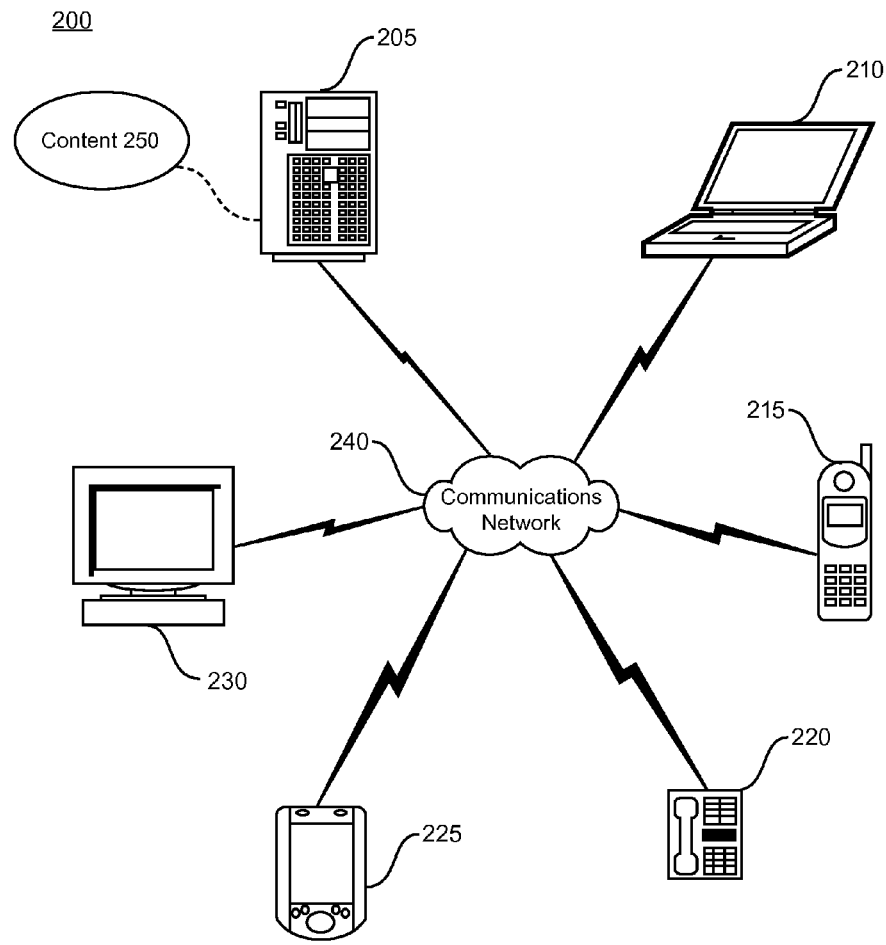
FIG. 4 illustrates an aspect of an exemplary embodiment of the present invention.

As shown in FIG. 4, computing system 100 can be deployed in networked computing environment 200. In general, the above description for computing system 100 applies to server, client, and peer computers deployed in a networked environment, for example, server 205, laptop computer 210, and desktop computer 230. FIG. 4 illustrates an exemplary illustrative networked computing environment 200, with a server in communication with client computing and/or communicating devices via a communications network, in which the herein described apparatus and methods may be employed.

As further shown in FIG. 4, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A computer-implemented system for providing cloud-based business intelligence data, responsively to received company information, comprising:
   a non-transitory computer readable storage medium having encoded thereon computer executable instructions for providing a local front end comprising a graphical user interface capable of locally querying a user for:
   an electronic location of the received company information; and
   ones of the business intelligence data to be displayed on the graphical user interface upon upload of the received company information from the electronic location;
   an at least partially remote back end, comprising:
   an accessing engine capable of accessing the electronic location for uploading to the cloud of only ones of the received company information indicative of the ones of the business data intelligence to be displayed; and
   a charging engine for charging an account of a user of the front end a per month monetary amount per the ones of the business intelligence data to be displayed.

2. The system of claim 1, wherein the account of the user comprises a credit card account.

3. The system of claim 1, wherein the account of the user comprises a third party payment account.

4. The system of claim 1, wherein the monetary amount is one dollar.

5. The system of claim 1, wherein the monetary amount is based on the amount of company information.

6. The system of claim 1, wherein the display of business intelligence data is through a dashboard.

7. The system of claim 1, further comprising at least one rules engine communicatively connected to the at least partially remote back end, and comprising a plurality of rules to generate, responsively to the business intelligence data, an alert.

8. The system of claim 1, wherein the graphical user interface is remote from the user.

9. The system of claim 1, wherein the received company information is at least one selected from the group consisting of a third party payment score, a credit score, a tax return, liabilities, debt incurred and cash accrued.

10. The system of claim 1, wherein the graphical user interface is accessible from at least two remote locations.

11. The system of claim 1, wherein the graphical user interface is accessible by at least two users.

12. The system of claim 1, wherein the user is not associated with the company.

13. The system of claim 1, wherein the company information is received through a valuation requester not associated with the company.

14. The system of claim 7, wherein the alert is sent to at least one user.

15. The system of claim 1, wherein uploading by the accessing engine is in real time.

16. A method for providing cloud-based business intelligence data, responsively to received company information, comprising:
    providing a local front end comprising a graphical user interface resident on a non-tansitory computer readable storage medium having encoded thereon computer executable instructions capable of locally querying a user for:
    receiving an electronic location of the company information;
    displaying ones of the business intelligence data on the graphical user interface upon upload of the received company information from the electronic location; providing an at least partially remote back end, comprising:
    uploading to the cloud only ones of the received company information indicative of the ones of the business data intelligence to be displayed;
    charging an account of a user of the front end a per month monetary amount per the ones of the business intelligence data to be displayed; and
    alerting a user to a change in the business intelligence data responsively to at least one of a plurality of rules from a rules engine communicatively connected to the at least partially remote back end.

17. The method of claim 16, wherein the account of the user comprises a credit card account.

18. The method of claim 16, wherein the account of the user comprises a third party payment account.

19. The method of claim 16, wherein the monetary amount is one dollar.

20. The method of claim 16, wherein the monetary amount is based on the amount of company information.

21. The method of claim 16, wherein the display of business intelligence data is through a dashboard.

22. The method of claim 16, wherein the graphical user interface is remote from the user.

23. The method of claim 16, wherein the received company information is at least one selected from the group consisting of a third party payment score, a credit score, a tax return, liabilities, debt incurred and cash accrued.

24. The method of claim 16, wherein the graphical user interface is accessible from at least two remote locations.

25. The method of claim 16, wherein the graphical user interface is accessible by at least two users.

26. The method of claim 16, wherein the user is not associated with the company.

27. The method of claim 16, wherein the company information is received through a valuation requester not associated with the company.

28. The method of claim 16, wherein uploading is in real time.

* * * * *